July 6, 1965  R. E. HALVERSON  3,192,615
ARTICLE ASSEMBLING APPARATUS
Filed Nov. 12, 1963  4 Sheets-Sheet 1
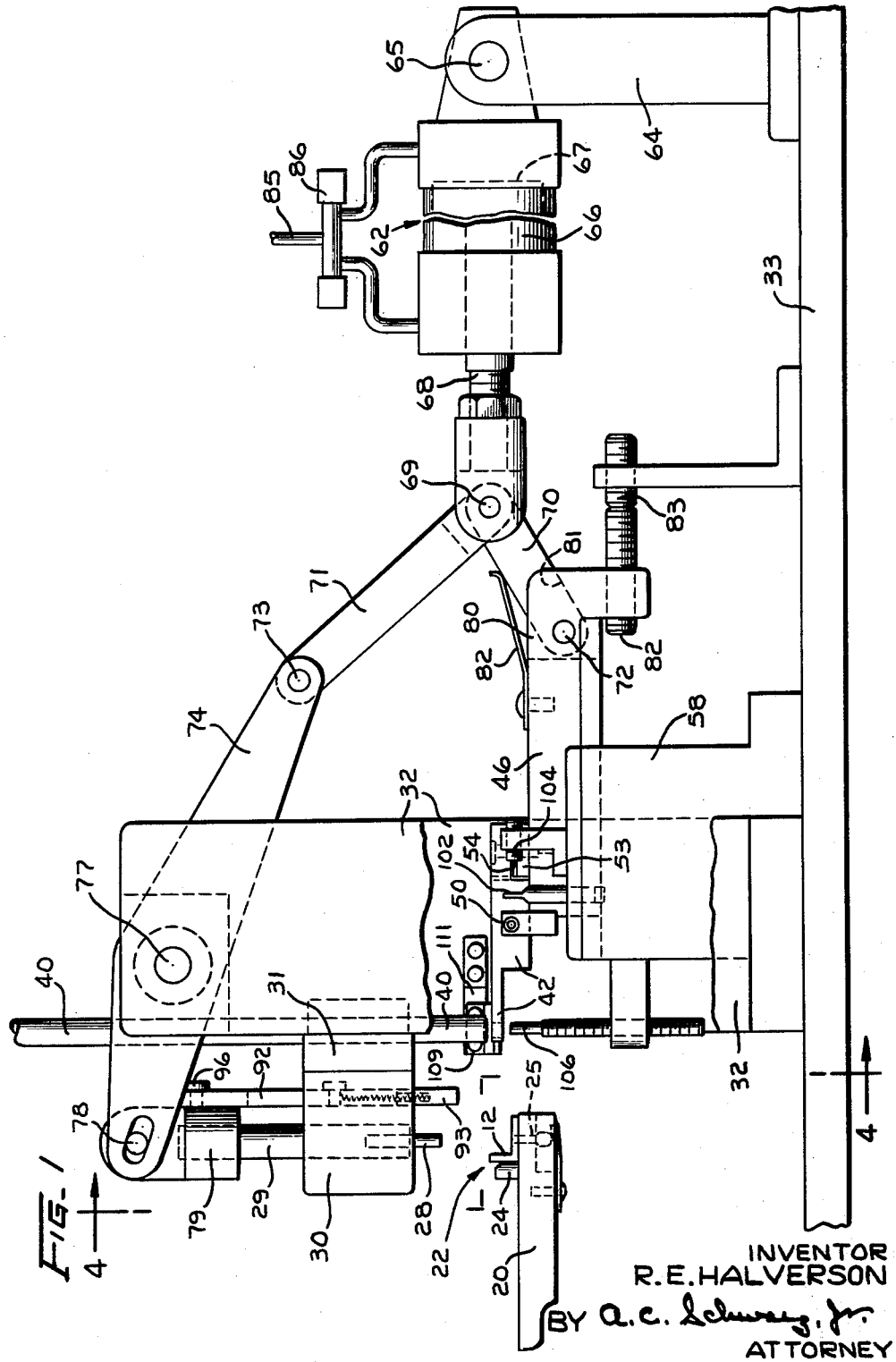
INVENTOR
R.E. HALVERSON
BY A.C. Schwarz, Jr.
ATTORNEY

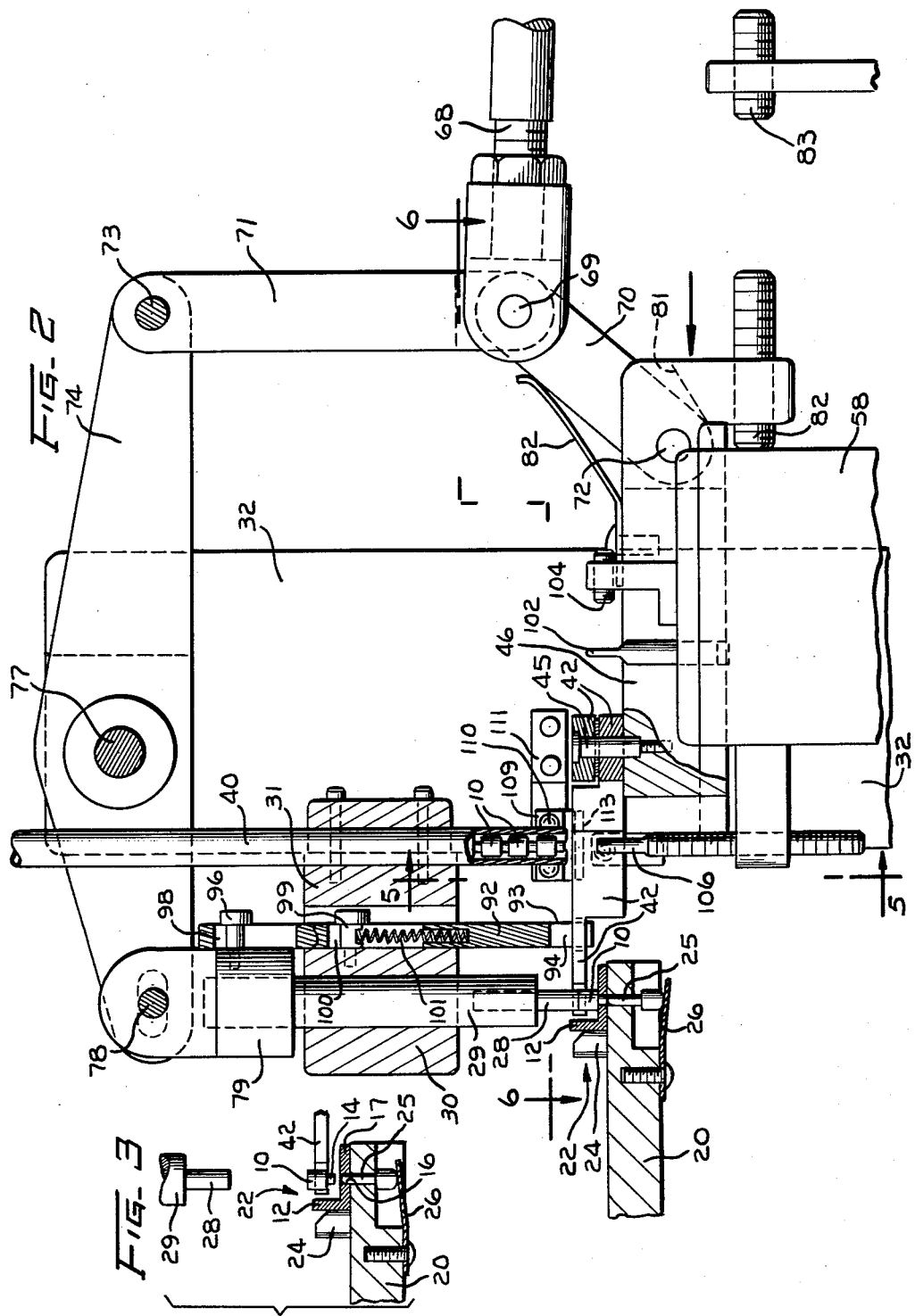

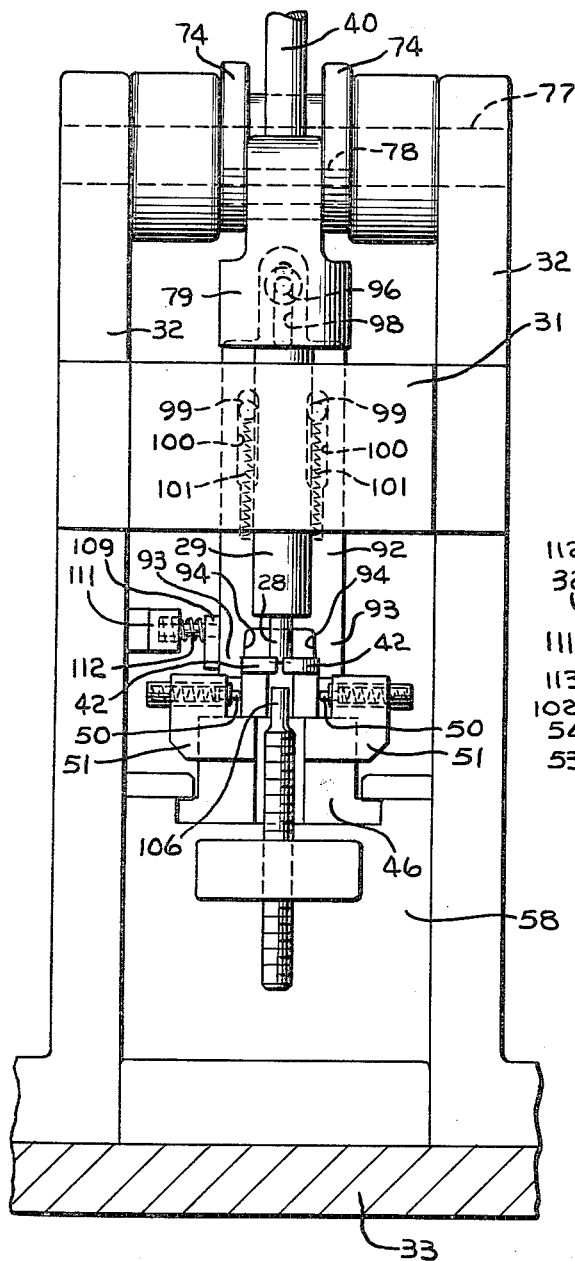
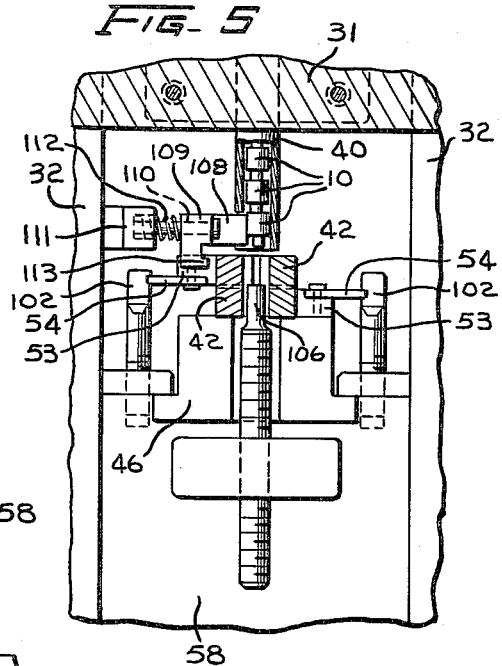

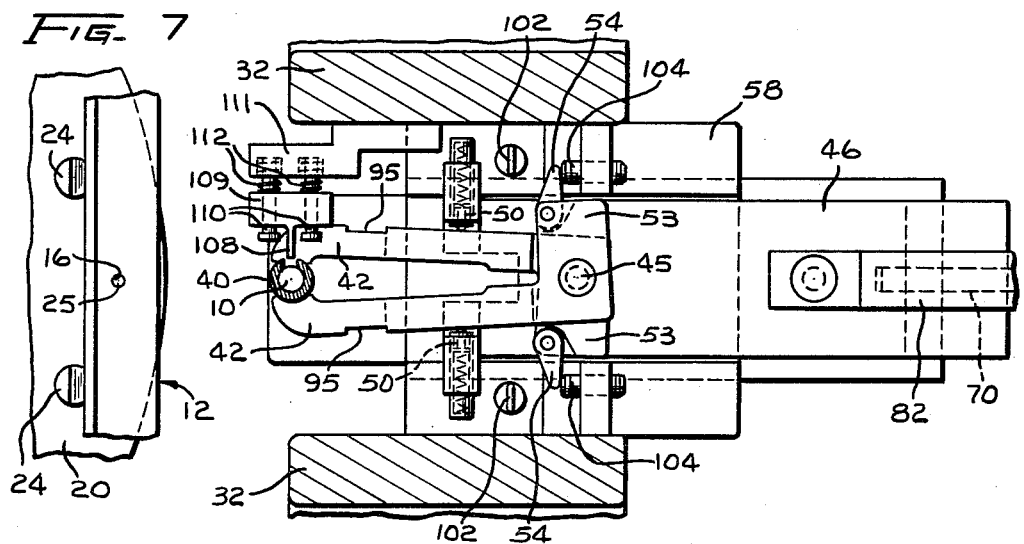
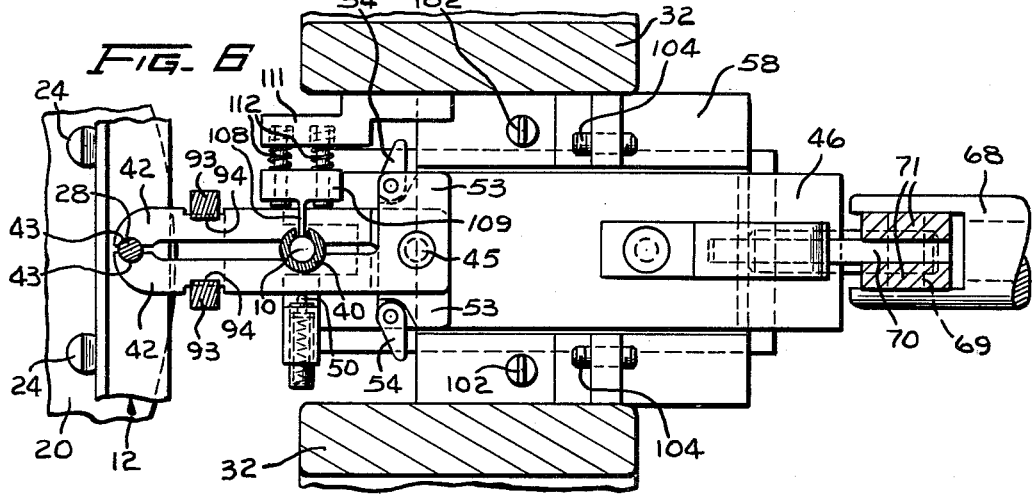
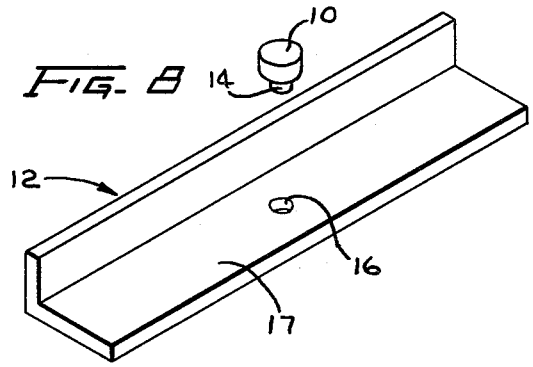

United States Patent Office 3,192,615
Patented July 6, 1965

3,192,615
ARTICLE ASSEMBLING APPARATUS
Richard E. Halverson, Westchester, Ill., assignor to Western Electric Company, Incorporated, New York, N.Y., a corporation of New York
Filed Nov. 12, 1963, Ser. No. 322,784
6 Claims. (Cl. 29—211)

This invention relates to article assembling apparatus, and more particularly to an apparatus for pressing parts into apertured articles.

An object of the invention is to provide a novel apparatus for assembling composite articles.

A further object of the invention is to provide an apparatus for pressing parts into apertured articles.

An apparatus for pressing headed parts into apertured articles illustrating certain features of the invention may include a tubular magazine for supporting a stack of the parts with the lower part yieldably retained in the magazine above and adjacent to a pair of elongated transfer fingers which are mounted at one end for pivotal movement on a horizontally movable slide, the transfer fingers being urged toward each other and having recesses at the other ends thereof for receiving a part therebetween. In response to movement of the slide to a retracted position the transfer fingers are aligned with the magazine and are actuated to open position and effect the release of the lowermost part and the reception thereof between the fingers whereupon the slide is advanced to effect the gripping of the part between the fingers and the movement thereof to a forward position in which it is supported below a vertically movable plunger and above an apertured article supported on a holder.

The plunger is connected at its upper end to one end of a lever which is supported intermediate its ends about a fixed pivot. The other end of the lever and the slide are connected to the outer ends of a pair of toggle links, the inner ends of which are connected to a piston rod of a fluid-operated actuator that is supported for pivotal movement about a fixed pivot and actuates the piston rod in a substantially horizontal direction. The link interconnecting the slide and the piston rod is spring urged to a normal first oblique poistion on the slide and operates in response to the first portion of the advance movement of the piston rod to move the slide and the fingers with a part therein to the advanced position, after which the link on the slide is caused to pivot to a second oblique position and through the linkage associated therewith to impart a downward movement to the plunger to effect the pressing of the part into assembled relation with the article. In response to the first portion of the return movement of the piston rod, the link is pivoted back to its first oblique position on the slide to effect the raising of the plunger, after which the slide is retracted causing the fingers which are still gripping a portion of the part to withdraw the assembled part and article from the holder.

Other objects, advantages and novel aspects of the invention will become apparent upon consideration of the following detailed description, in conjunction with the accompanying drawings, in which:

FIG. 1 is a side view of an apparatus for assembling parts embodying the present invention and with components of the apparatus in one position;

FIG. 2 is an enlarged fragmentary longitudinal sectional view of the apparatus with components thereof in a different position and the parts in assembled relationship;

FIG. 3 is an enlarged fragmentary view showing the parts supported in aligned relationship prior to being assembled;

FIG. 4 is a vertical sectional view taken along the line 4—4 in FIG. 1 and showing a major portion of the apparatus in elevation;

FIG. 5 is a vertical sectional view of the apparatus taken along the line 5—5 of FIG. 2;

FIG. 6 is a fragmentary plan sectional view of the apparatus taken on the line 6—6 of FIG. 2 and showing components thereof in an advanced position;

FIG. 7 is a fragmentary plan view of the apparatus similar to FIG. 6 and showing components thereof in a retracted position; and FIG. 8 is a perspective view of the parts to be assembled shown in separated relation to each other.

The present apparatus is designed to assemble a part 10 in the form of a headed hard rubber stud and an article 12 in the form of an angle bar by pressing the reduced shank 14 of the stud into an aperture 16 of the web 17 of the article 12.

The apparatus includes a feed table 20 which has seats for supporting the articles 12 thereon and which is indexed by suitable mechanism (not shown) to advance successive articles to an assembling station 22. The article supporting seats including a pair of pins 24 on the table engageable with one side of the article and a headed pin 25 mounted for vertical movement on the table. The pin 25 is stressed by leaf spring 26 to a normal upper position with the upper end of the pin engaging in the aperture 16 in the article for locating the aperture in a predetermined position at the assembling station 22 in coaxial alignment with the reduced end 28 of a plunger 29 of the apparatus for pushing the stud 10 into assembled relation with the article 12.

The plunger 29 is slidably supported for vertical movement in an apertured guide 30. The guide 30 is mounted on a member 31 that is secured to a pair of vertically disposed, laterally spaced frame members 32 mounted on and extending upwardly from a base plate 33. Reciprocation is imparted to the plunger 29 by mechanism later to be described.

As shown particularly in FIG. 2, a vertically disposed tubular magazine 40 is also secured to the stationary frame member 31 for supporting a stack of the studs 10 therein. The lower end of the magazine is located above and in close proximity to a pair of substantially parallel transfer fingers 42 which at one end thereof are provided with curved seats 43 (FIG. 6) engageable with the stud 10 for clamping the stud therebetween. The left-hand end portions of the transfer fingers, as viewed in FIG. 2, are relatively thin and in horizontally aligned relation to each other, the intermediate portion of the fingers being increased in vertical thickness and the right-hand end portions thereof being reduced, offset, and in superposed relation to each other and pivotally connected by a vertical pin 45 to each other and to a slide 46.

The transfer fingers 42 are urged toward each other by a pair of spring-pressed detents 50 (FIGS. 4, 6 and 7) which are mounted on portions 51 of the slide 46. Extending laterally in opposite directions from the reduced right-hand portions of the transfer fingers 52 are arms 53 (FIGS. 5 to 7) on each of which a pawl 54 is mounted for limited pivotal movement and is spring biased to a normal position as shown in FIG. 6.

The slide 46 is mounted in a supporting block 58 on the base plate 33 for horizontal movement to and from a normally retracted position with the seats 43 of the transfer fingers 42 in alignment with the magazine 40 for receiving a stud 10 (FIGS. 1 and 7), and a forward position with the seats 43 and the stud therein in vertical alignment with and between the plunger 29 and the aperture 16 of the piece part 12 on the feed table 20.

Mechanism including a fluid-operated actuator 62 is provided for effecting the sequential horizontal reciprocation of the slide 46 to and from retracted and forward positions and the vertical reciprocation of the plunger 29 to effect the assembly of the stud 10 to the article 12. The actuator 62 is supported by a bracket 64 on the base plate 33 for pivotal movement about a pin 65 and includes a cylinder 66 and a piston 67 and piston rod 68 reciprocable relative thereto. The end of the piston rod 68 is pivotally connected at 69 to one end of a pair of links 70 and 71, the former of which is pivotally connected by a pin 72 to the slide 46, and the latter of which is pivotally connected at 73 to a lever 74. Intermediate its ends, the lever 74 is mounted for pivotal movement on a pin 77 that is supported by the vertical frame members 32, and at its other end the lever 74 is connected through a pin and slot connection 78 to the head 79 of the plunger 29.

The link 70 interconnecting the slide 46 and the piston rod 68 fits partly into a slot 80 in the slide 46 and is stopped in its clockwise movement about the pivot 72 as viewed in FIG. 1 by a stop surface 81 of the slide in a normal oblique first position at an acute angle relative to the horizontal movement of the slide. A leaf spring 82 secured at one end to the slide urges the link 70 for rotation in a clockwise direction against the stop surface 81 to yieldably maintain the link 70 in the normal first position and to yieldably maintain the toggle joint formed by the links 70 and 71 in a bent condition. The slide 46 is stopped in its forward position by engagement of a stop member 82 on the slide with the supporting block 58, and the slide 46 is stopped during its return movement in its retracted position by the engagement of the stop member 82 with a stationary stop 83 secured to the base plate 33. Actuation of the piston rod 68, the slide 46 and the plunger 29 is affected in response to the flow of compressed air from a supply line 85 thereof to opposite ends of the actuator 62 under control of a valve 86.

The arrangement of the drive mechanism with its single actuator 62 is such as to effect the sequential operation of the slide 46 and the plunger 29. With the apparatus in its unactuated position as shown in FIG. 1, in response to the first portion of the forward movement of the piston rod 68 the slide 46 is advanced thereby with the link 70 in its normal first position until the slide is stopped in its forward position with the stud 10 carried by the transfer fingers 42 located below and in alignment with the plunger 29, after which continued movement of the piston rod 68 imparts pivotal movement of the link 70 in a counterclockwise direction about the pivot pin 72 to a second oblique position on the side as shown in FIG. 2. Pivotal movement of the link 70 from the first to the second position imparts, through the link 71 and the lever 74, a downward movement to the plunger 29 to cause the lower end 28 of the plunger to engage and press the stud downwardly into assembled relation with the article 12. In response to the first portion of the return movement of the piston rod 68 the link 70 is pivoted from its second position to its normal first position during which movement the plunger 29 is moved toward its upper position, and after the link 70 has reached its normal first position continued movement of the piston rod 68 affects the movement of the slide 46 to its retracted position with the seats 43 in the transfer fingers in alignment with the magazine 40 (FIGS. 1 and 7).

Inasmuch as the transfer fingers 42 are pivoted at one end at 45 and are capable of lateral pivotal movement relative to the centerline of the slide, mechanism is provided for centralizing the transfer fingers so as to position the stud 10 supported thereby in coaxial alignment with the aperture 16 in the piece part 12 and with the plunger 29 prior to the actuation of the plunger 29. The mechanism is in the form of an aligning plate 92 having a pair of downwardly projecting arms 93 provided with sloping inner surfaces 94 which are engageable with cooperative surfaces 95 (FIG. 6) on the transfer fingers 42. The aligning plate 92 is connected at its upper end by a pin 96 to the head 79 of the plunger 29, the pin 96 riding in a vertical slot 98 in the upper portion of the aligning plate 92. A pair of guide pins 99 (FIGS. 2 and 4) fixedly mounted on the guide member 30 ride in vertical slots 100 in the aligning plate and cooperate with the pin 96 to guide the plate 92 for vertical movement with the plunger 29. Springs 101 fitting in recesses in the guide plate and bearing at their upper ends against the guide pins 99 urge the guide plate downwardly.

Thus, after the slide 46 has advanced the transfer fingers 42 to the forward position with the stud 10 supported above the web 17 and the aperture 16 of the article 12, as the plunger 29 descends, the aligning plate 92 moves downwardly therewith to cause the aligning arms 93 to straddle the transfer fingers 42 and cause the sloping surfaces 94 thereon to engage and centralize the fingers 42 and thereby bring the stud 10 into coaxial alignment with the aperture 16. With the centralization of the transfer fingers, the downward movement of the centralizing plate 92 is arrested while the plunger 29 continues its downward movement to effect the pressing of the shank portion 14 of the stud 10 into the aperture 16 of the article 12. As the shank 14 is pressed into the aperture 16 it pushes the pin 25 from the aperture.

The height of the stud 10 is such that upon completion of the assembly of the stud 10 to the article 12, the upper portion of the stud fits within the transfer fingers 42 and is gripped thereby so that in response to the return movement of the slide 46, the transfer fingers through its grip on the stud 10 serve to slide the assembly 10, 12 laterally from the feed table 20. At a predetermined point during this return movement the transfer fingers 42 are momentarily opened to release the stud and allow the assembly to drop into a receptacle positioned thereunder. The momentary opening of the transfer fingers 42 is effected by a pair of stationary abutment members 102 which are mounted on the supporting block 58 in the path of movement of the pawls 54 on the lateral arms 53 of the transfer fingers 42 and serve to engage the pawls 54 and effect the momentary pivoting of the transfer fingers 42 to open position during the return movement only of the transfer fingers.

During the final portion of the return movement of the transfer fingers to their retracted positions, the pawls 54 on the lateral arms 53 of the transfer fingers 42 engage stationary stops 104 and are actuated thereby to pivot the transfer fingers slightly to an open position and thus permit the lowermost stud 10 in the magazine 40 to drop from the magazine 40 into engagement with a stop 106 therebelow and be supported thereby between the seats 43 of the transfer fingers 42. The stop 106 is fixedly supported on the supporting block 58. In response to forward movement of the slide 46 and the transfer fingers 42, the pawls 54 move from the stop members 104 and the spring-pressed detents 50 urge the transfer fingers toward each other to grip the stud 10 therebetween. As the slide continues its forward movement the pawls 54 oscillate about their pivots as they engage and pass by the abutment members 102.

The lowermost stud 10 is releasably held in the magazine 40 by a narrow portion 108 of a retaining member 109 (FIGS. 4 to 6), which narrow portion fits through a slot in the lower portion of the magazine 40. The retaining member 109 is mounted for horizontal movement toward and away from the magazine on a pair of headed pins 110 which are secured to a bracket 111 mounted on one of the vertical frame members 32. Springs 112 on the pins 110 urge the retaining member 109 into engagement with the stud 10 to press it against the opposite wall of the magazine to yieldably retain it and the stack of studs against downward movement. The retaining member has a downwardly directed portion 113 (FIG. 4) which is positioned beside and in horizontal alignment with one of the transfer arms 42 for actuation thereby to release the lowermost stud 10 in response to movement of the transfer fingers 42 to open position as the slide 46 is moved to its retracted position.

From the present disclosure, it will be seen that a compact and effective assembly apparatus is provided including a drive mechanism having a single actuator for effecting the sequential operation of mechanism for feeding parts to an assembling station and mechanism for acting on the parts to press them into assembled relation with other parts.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device of the type described:

a plunger;

mounting means for supporting said plunger for reciprocatory movement along a first path;

holding means supported on said mounting means for limited movement along a second path transversely of said first path to a retracted position for receiving an article and to a forward position for supporting the article in the path of said plunger;

a fluid operated actuator pivotally supported on said mounting means and having a reciprocatory rod movable in the general direction of the second path;

a link pivotally connected at one end to one end of said rod and connected at the other end thereof to said article holding means for limited pivotal movement thereon to and from first and second positions in acute and less acute angular relation respectively to the second path;

resilient means for urging said link to the first position, the arrangement being such that in response to the forward movement of said rod said article holding means is first moved from the retracted position to the forward position with the link in the first position after which said link is pivoted to the second position, and in response to the return movement of said rod said link is first pivoted from the second position to the first position on said article supporting means after which said article supporting means is moved from the forward position to the retracted position; and means responsive to the movement of said link to and from the first and the second positions for effecting the reciprocation of said plunger.

2. In a device of the type described:

a plunger;

mounting means for supporting said plunger for vertical reciprocatory movement;

holding means supported on said mounting means for limited horizontal movement to and from a retracted position for receiving an article and a forward position for supporting the article in the path of said plunger;

a fluid operated actuator pivotally supported on said mounting means and having a reciprocatory rod movable in a substantially horizontal direction;

a link pivotally connected at one end to one end of said rod and connected at the other end thereof to said article holding means for limited pivotal movement from a normal first position forming an acute angle relative to the horizontal to a second position disposed at a less acute angle to the horizontal;

resilient means for urging said link to the first position, the arrangement being such that in response to the forward movement of said rod said article holding means is first moved from the retracted position to the forward position with said link in the first position after which the link is moved to the second position, and in response to the return movement of said rod said link is first pivoted from the second position to the first position on said article supporting means after which said article supporting means is returned from the forward position to the retracted position; and linkage interconnecting said one end of said link and said plunger for effecting the reciprocation of said plunger in response to movement of said link to and from the first and the second positions.

3. In a device of the type described:

a plunger;

mounting means for supporting said plunger for reciprocatory movement along a first path;

a lever pivotally supported intermediate its ends on said mounting means and operatively connected at one end thereof to said plunger;

article holding means supported on said mounting means for limited movement along a second path transversely of said first path to a retracted position for receiving an article and to a forward position for supporting the article in the path of said plunger;

a fluid operated actuator pivotally supported on said mounting means and having a reciprocatory rod movable in directions substantially parallel to said second path;

a first link pivotally connected at one end to said rod and pivotally connected at the other end to said article holding means for limited pivotal movement thereon to and from first and second positions; in acute and less acute angular relation respectively to the second path;

a second link interconnecting the other end of said lever and said one end of said first link and cooperable with said first link to form a toggle joint; and resilient means for urging said first link to said first position with said toggle joint in a bent condition, the arrangement being such that in response to forward movement of said rod, said article holding means is first advanced to the forward position with said first link in the first position after which said first link is pivoted to said second position to effect the actuation of said plunger into engagement with the article, and in response to return movement of said piston rod said first link is pivoted from the second position to the first position on said article holding means to effect the upward movement of said plunger after which said article holding means is returned to the retracted position.

4. A device for assembling a part to an article comprising:

a pair of transfer fingers recessed at one end for receiving a part therebetween;

a slide for supporting the transfer fingers for pivotal movement about a vertical axis;

mounting means for supporting said slide for horizontal movement to retracted and forward positions to locate the recessed ends of the fingers in alignment with first and second vertical axes respectively;

a magazine supported on said mounting means coincident with said first axis above and in close proximity to said transfer fingers for supporting a stack of parts therein;

means responsive to the movement of said slide to the retracted position to effect the feeding of a part from said magazine to said transfer fingers;

a plunger mounted above said transfer fingers for reciprocatory movement along said second axis;

a holder for supporting an article in a predetermined position beneath said plunger and below the path of movement of said transfer fingers;

an actuator pivotally supported on said mounting means and having a rod movable in a substantially horizontal direction;

a first link pivotally connected at one end to said rod and connected at the other end thereof to said slide for limited pivotal movement to and from first and second positions;

a lever pivotally supported intermediate its ends on said mounting means and operatively connected at one end thereof to said plunger;
a second link interconnecting the other end of said lever and said one end of said rod and cooperable with said first link to form a toggle joint; and
resilient means for urging said first link to said first position, the arrangement being such that in response to forward movement of said rod said slide is moved to the forward position with said first link in the first position after which said first link is rotated to the second position and actuates said second link and said lever to effect the downward movement of the plunger and the assembly of the part to the article, and in response to the return movement of said rod, said first link is first pivoted on said slide from the second position to the first position to actuate said second link and said lever and effect the raising of the plunger after which said slide is returned to the retracted position.

5. In a device of the type described:
a slide mounted for horizontal movement;
a pair of transfer fingers recessed at one end for receiving a part therebetween and pivotally mounted at the other end on said slide for movement about a vertical axis;
a magazine mounted above and in close proximity to said transfer fingers for supporting a stack of parts therein;
yieldable means engageable with the lowermost part for retaining said part in said magazine;
a plunger mounted above said transfer fingers for vertical movement;
drive means for reciprocating said slide to and from retracted and advanced positions to align the recessed ends of said fingers with said magazine and with said plunger respectively and to reciprocate said plunger;
resilient means for urging said transfer fingers to closed position to grip a part therebetween;
means responsive to the movement of said slide to the retracted position for moving said transfer fingers to an open position to receive the lowermost part from said magazine;
means responsive to the movement of said fingers to open position to actuate said yieldable retaining means to release the lowermost part from said magazine;
means for stopping the part at a predetermined elevation between said transfer fingers;
a holder for supporting an apertured article in a predetermined position beneath said plunger and the path of said transfer fingers and with the aperture therein in vertical alignment with said plunger, said plunger being effective to press the part downwardly into assembled relation with the article without disengaging the upper portion of the part from said transfer fingers whereby in response to movement of said slide to the retracted position the article is removed by said transfer fingers from the article holder; and
means operable at a predetermined point during the return movement of said transfer fingers for momentarily actuating the transfer fingers to open position to release said part and allow the article to drop from said fingers.

6. In a device of the type described:
a plunger;
mounting means for supporting said plunger for vertical movement along a first path;
a holder for supporting an article with an aperture in a predetermined position below and in the path of movement of said plunger;
a slide supported on said mounting means for horizontal movement between a retracted position and a forward position;
means for effecting the sequential actuation of said plunger and said slide;
a pair of transfer fingers connected at one end to said slide for pivotal movement about a vertical axis and having seats at the other end thereof for receiving a part therebetween;
resilient means for urging said transfer fingers toward each other to grip the part;
a centralizing member supported on said mounting means for vertical movement and having a pair of opposed sloping surfaces for receiving said fingers therebetween to centralize said fingers so as to align the part thereon with said plunger and with the aperture in the article;
resilient means for urging said centralizing member downwardly into engagement with said fingers; and
means interconnecting said plunger and said centralizing member for movement of the latter with said plunger and in advance thereof into engagement with said fingers and for movement of said plunger relative to said centralizing member into engagement with the part.

References Cited by the Examiner
UNITED STATES PATENTS

| 2,896,208 | 7/59 | Alderman et al. | 1—321 |
| 3,109,230 | 11/63 | Newton | 29—203 |
| 3,110,955 | 11/63 | Hedel | 29—203 |

WHITMORE A. WILTZ, Primary Examiner.

THOMAS H. EAGER, Examiner.